United States Patent
Al-Fouzan et al.

(10) Patent No.: US 11,607,639 B2
(45) Date of Patent: Mar. 21, 2023

(54) AIR INTAKE CONDITION MONITORING SYSTEM (CMS)

(71) Applicant: Saudi Arabian Oil Company, Dhahran (SA)

(72) Inventors: Hamad Al-Fouzan, Dammam (SA); Omar Masoudi, Al Khobar (SA); Nasser Alospi, Al Hafouf (SA); Kevin M. Triplett, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 195 days.

(21) Appl. No.: 17/140,355

(22) Filed: Jan. 4, 2021

(65) Prior Publication Data

US 2022/0212134 A1     Jul. 7, 2022

(51) Int. Cl.
*B01D 46/71* (2022.01)
*B01D 46/46* (2006.01)
*B01D 46/42* (2006.01)
*B01D 46/44* (2006.01)

(52) U.S. Cl.
CPC ......... *B01D 46/71* (2022.01); *B01D 46/4272* (2013.01); *B01D 46/46* (2013.01); *B01D 46/446* (2013.01)

(58) Field of Classification Search
CPC ........ B01D 46/66; B01D 46/70; B01D 46/71; B01D 46/715; B01D 46/4272; B01D 46/46; B01D 46/446; B01D 46/0086
See application file for complete search history.

(56) References Cited

U.S. PATENT DOCUMENTS

| | | | |
|---|---|---|---|
| 2006/0272301 A1* | 12/2006 | Morse | B01D 46/42 55/439 |
| 2017/0021309 A1* | 1/2017 | Yoon | B01D 65/08 |
| 2017/0036154 A1* | 2/2017 | Lauterbrunner | B01D 46/71 |
| 2019/0076771 A1* | 3/2019 | Baxter | B01D 46/0084 |
| 2020/0133255 A1 | 4/2020 | Celia et al. | |
| 2020/0133257 A1 | 4/2020 | Celia et al. | |
| 2020/0225655 A1 | 7/2020 | Celia et al. | |
| 2020/0298163 A1* | 9/2020 | Baxter | B01D 46/0086 |

FOREIGN PATENT DOCUMENTS

| | | |
|---|---|---|
| CN | 204121888 | 1/2015 |
| JP | 2002292215 | 10/2002 |
| JP | 2004124764 | 4/2004 |

OTHER PUBLICATIONS

CIBSE. Design and Operation of Modern Steam Systems—CIBSE TM58—2015—5.4.3.1 Orifice Plate Flowmeters. The Chartered Institution of Building Services Engineers (CIBSE). p. 21. Retrieved from https://app.knovel.com/hotlink/pdf/id:kt0114TQD1/design-operation-modern/orifice-plate-flowmeters (Year: 2015).*

* cited by examiner

*Primary Examiner* — Jonathan Miller
*Assistant Examiner* — Gabriel E Gitman
(74) *Attorney, Agent, or Firm* — Fish & Richardson P.C.

(57) ABSTRACT

The present disclosure describes a computer-implemented method that includes: monitoring an air pressure gap between two positions inside a pipe of an air filtration system; generating a first cleaning pulse inside the pipe to cause a drop of the air pressure gap being monitored; comparing a characteristic of the drop of the air pressure gap with a known profile; and based on results of the comparing, determining a status of at least one filter or filter cleaning component of the air filtration system.

14 Claims, 6 Drawing Sheets

AIR INTAKE CONDITION MONITORING SYSTEM (CMS)

TECHNICAL FIELD

This disclosure generally relates to methods, systems, and apparatus for monitoring and controlling an air intake filtration system.

BACKGROUND

An air intake filtration system can include a pulsed air self-cleaning mechanism to provide a cleaning air pulse for maintaining filter cartridges. Such system generally relies on local control panels bulkhead mounted and situated in the vicinity of their respective machinery unit.

SUMMARY

In one aspect, the present disclosure describes a computer-implemented method comprising: monitoring, through a control system, an air pressure gap between two positions inside a pipe of an air filtration system; generating a first cleaning pulse inside the pipe to cause a drop of the air pressure gap being monitored; comparing a characteristic of the drop of the air pressure gap with a known profile; and based on results of the comparing, determining a status of at least one filter or filter cleaning component of the air filtration system.

Implementations may include one or more of the following features.

The method may further include: in response to determining that the status of at least one filter or filter cleaning component of the air filtration system is abnormal, sending an alarm to an operator to alert the operator. The method may further include: based on results of the comparison, determining an effectiveness of the first cleaning pulse. The method may additionally include: in response to determining that the effectiveness of the first cleaning pulse is below a threshold, generating a second cleaning pulse inside the pipe. The second cleaning pulse may be different from the first cleaning pulse.

The method may further include: generating the first cleaning pulse comprises: energizing one or more solenoids to discharge compressed air into the pipe. A characteristic of the drop of the air pressure gap may include any combination of: a magnitude of the drop, a recovery time for the air pressure gap to return to a pre-drop level. Comparing a characteristic of the drop of the air pressure gap with a known profile may include: perform at least one of: a regression function, or a decision tree algorithm. The known profile may be established based on a historical record of known responses. The two positions inside the pipe may be respectively located upstream and downstream of an orifice with an inner diameter smaller than the pipe.

In another aspect, the present disclosure describes a computer system comprising: one or more processors configured to perform operations of: monitoring, through a control system, an air pressure gap between two positions inside a pipe of an air filtration system; generating a first cleaning pulse inside the pipe to cause a drop of the air pressure gap being monitored; comparing a characteristic of the drop of the air pressure gap with a known profile; and based on results of the comparing, determining a status of at least one filter or filter cleaning component of the air filtration system.

Implementations may include one or more of the following features.

The operations may further include: in response to determining that the status of at least one filter or filter cleaning component of the air filtration system is abnormal, sending an alarm to an operator to alert the operator. The operations may further include: based on results of the comparing, determining an effectiveness of the first cleaning pulse. The operations may further include: in response to determining that the effectiveness of the first cleaning pulse is below a threshold, generating a second cleaning pulse inside the pipe. The second cleaning pulse may be different from the first cleaning pulse.

The operations may further include: generating the first cleaning pulse comprises: energizing one or more solenoids to discharge compressed air into the pipe. A characteristic of the drop of the air pressure gap may include one of: a magnitude of the drop, a recovery time for the air pressure gap to return to a pre-drop level. Comparing a characteristic of the drop of the air pressure gap with a known profile may include: perform at least one of: a regression function, or a decision tree algorithm. The known profile may be established based on a historical record of known responses. The two positions inside the pipe may be respectively located upstream and downstream of an orifice with an inner diameter smaller than the pipe.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DETAILED DESCRIPTION

Like reference numbers and designations in the various drawings indicate like elements.

The present disclosure describes a process for monitoring an air intake filtration system by inspecting a sequence of events of the cleaning cycle and measuring the effectiveness of each pulsing signal. For context, an air intake filtration system can include a pulsed air self-cleaning system to provide a series of cleaning air pulses for the whole filter cartridges of a filter house in an automated control manner. In various filtration systems, the number of filter cartridges can be, for example, more than 350, along with, for example, more than 88 solenoid-controlled air valves (solenoid valves). However, since the control is operating through a local control cabinet, all failure scenarios and deficiencies of the cleaning system may not be monitored in a holistic manner. Indeed, the maintenance record shows enormous instrumentation failures of the cleaning system which resulted in the clogging of many filter cartridges, causing abnormal buildup of differential pressure across the system.

The common instrumentation failures can include several of the following problems. The first failure can be control program card failure. This type of failure can cease the cleaning cycles for complete filter bank, which will operate as static, uncleaned filters. The second failure can be malfunctioning of, for example, 90% of solenoid valves. The third failure can be an air leak of the flexible joints. The fourth failure can be the malfunctioning of diaphragm air valves.

These issues can be detected, and corrected timely if the pulse cleaning system can be monitored and intermittent abnormalities are reported during the cleaning pulses. Indeed, to establish efficient cleaning cycles online, some implementations advantageously seek to monitor the sequence of events of the cleaning cycle and to measure the effectiveness of each pulsing signals.

Some implementations may include installing one or more fast-sampling pressure transmitters in addition to the existing pressure gage at the plant air manifold, which supply its filtration system (e.g., the Donaldson filter) with the inflow air for the cleaning pulses. The fast sampling pressure transmitters are connected to a control system. The transmitters will measure the pressure disturbance across the orifice during each pulsing signal. By measuring typical pressure variation and recovery pressure timing, correlation of the cleaning effectiveness for each cleaning pulse can be established. An alarm signal will be initiated for an abnormal pressure variation and the sequence of events will record the time and the instrument loop identification where the problem is identified. The implementations may further include sending online notification for the recorded and identified abnormalities to enable the maintenance personnel to act proactively such that the effectiveness of the cleaning cycles is re-established and low differential pressure across the filter house is achieved.

Numerous differentiating advantages and benefits are associated with the implementations of the present disclosure. For example, implementations can prolong service life of the filter cartridges and hence lower expenses, Implementations can save fuel gas by virtue of operating at lower differential pressure profiles across the system. In some cases, the estimated cost saving can be $115,000.00 per year for one gas turbine (GT) alone, Implementations can achieve higher output power to provide extra margin of operating at exhaust temperature control during summer seasons. Implementations can improve reliability by alerting maintenance to component degradation and failure. Implementations can improve operations by allowing operators to adjust system parameters in response to adverse environmental conditions, such as during sandstorms.

Figure 1:
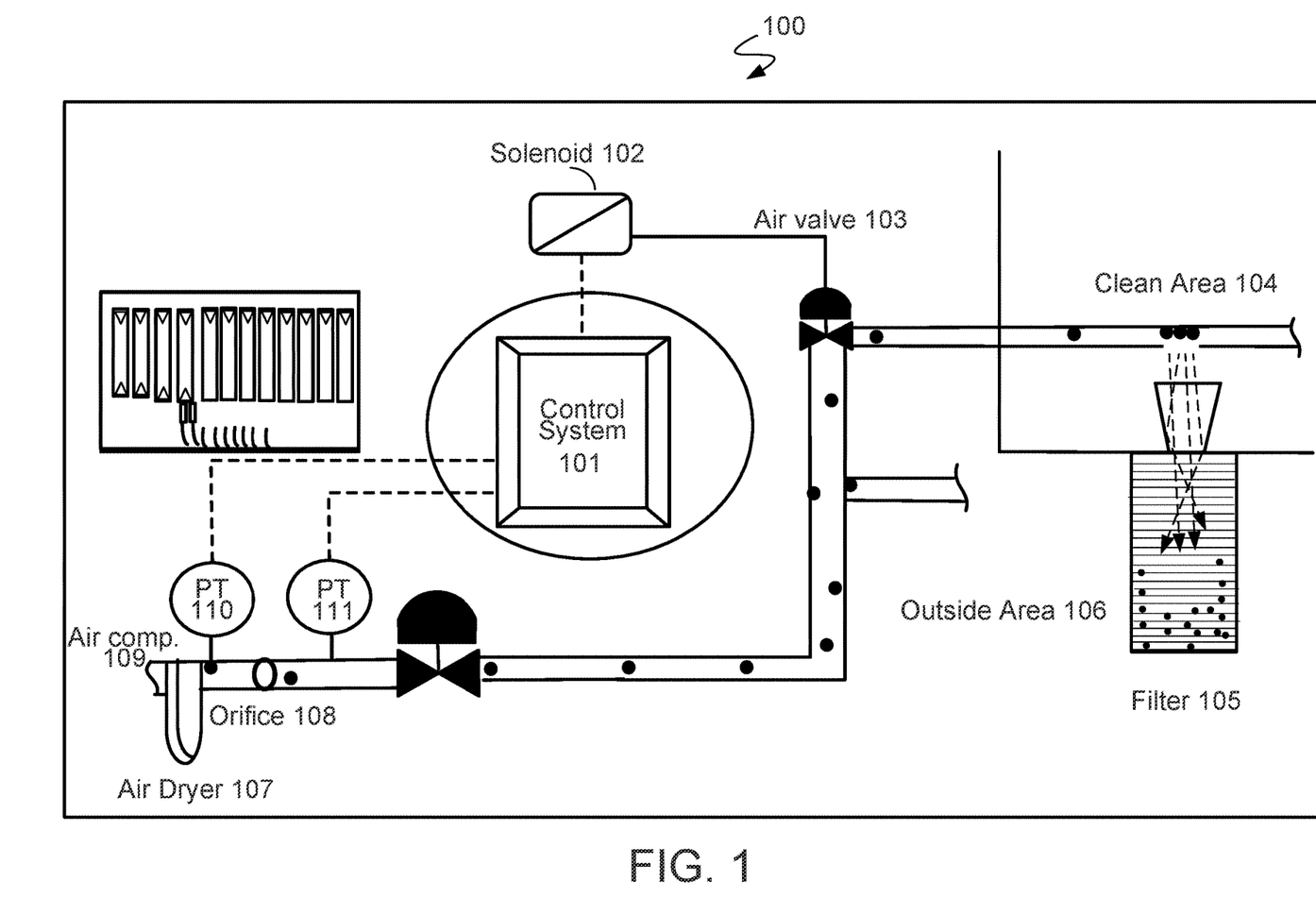
FIG. 1 illustrates an example of a diagram of an air intake filtration system according to an implementation of the present disclosure.

FIG. 1 illustrates an example of a diagram of an air intake filtration system 100 according to an implementation of the present disclosure. A control system 101 gathers realtime data from pressure sensors of the air intake filtration system 100 and drives solenoid valve 102 to generate air cleaning pulses based on the realtime air pressure data. In various implementations, the air pressure data can include air pressure drop across the filter house. The cleaning pulse can be transmitted via air valve 103. As illustrated, air compressor 109 drives air into a pipe to provide an air supply. Pressure transmitter (PT) 110 is installed upstream of the pressure regulator, for example, the orifice 108, while pressure transmitter (PT) 111 is installed downstream of the same pressure regulator. Realtime measurement data from PT 110 and PT 111 can be transmitted to control system 101. In some cases, the downstream transmitter PT 111 can provide the majority of data for condition monitoring.

Air dryer 107 can be a compressed air dryer configured to remove water inherent in compressed air. The process of compressing air raises its temperature and concentrates atmospheric contaminants, primarily water vapor. Consequently, the compressed air is generally at an elevated temperature and at a high (e.g., up to 100%) relative humidity. An air dryer can remove water vapor from compressed air to prevent condensation from occurring and to prevent moisture from interfering in sensitive industrial processes.

Air valve 103 may be configured to receive air cleaning pulses from solenoid valve 102. Control system 101, based on realtime measurement data from PT 110 and PT 111, can determine the timing for driving solenoid valve 102 to generate cleaning pulses through air valve 103 for the filtration system. Each time the control system 101 energizes solenoid valve 102, air pressure triggers the air valve 103, which can include diaphragm valves, to discharge a burst of compressed air into the filters to dislodge dust particles that may have accumulated on the media surface. As a result, cleaner air may enter clean area 104 where a single typical air filter cartridge 105 is located to trap the dust particles and water vapor present in outside area 106. Implementations are not limited to detecting failures of air filter cartridges alone. Some implementations can include filter cleaning components, which refers to components such as air valves piping. As used in the present disclosure, these components can be the most likely to fail, while the implementations can identify which filter is also likely clogged.

An exemplary air intake filtration system may incorporate a pulsed air self-cleaning system (for example, a Donaldson system) to provide the required cleaning air pulses for the whole filter cartridges. In some cases, the number of filter cartridges can be more than 350, along with more than 88 solenoid control air valves. This exemplary system is capable of adjusting the pulsing on/off time locally from the sequencer board onsite of the installation. Because the control is operating through local control cabinet, all failure scenarios and deficiencies of the cleaning system are not monitored through a process control system (for example, a distributed control system (DCS)), or a pressure monitoring system (for example, PI® system as provided by OSIsoft LLC). Additionally, in the absence of information about the filter health status, field engineers remain unable to decide how and when to adjust the pulsing on/off time for optimum cleaning performance. Here, the filter health status refers to the effectiveness of the filtration to maintain a high air intake quality going into the gas turbine. The air quality is directly affected by the number of clean air filter cartridges and the sustainability of providing the necessary pressured air pulses to these filter cartridges via the air pressure valve system provided by, for example, a Donaldson filter.

As a result, substantial and undetected instrumentation failures of the cleaning system can occur, resulting in clogging of many filter cartridges that cause abnormal buildup of differential pressure across the filter house. In fact, a survey conducted at one representative site reveals several of the following failure modes. The first failure can be control program card failure. This type of failure can cause the cleaning cycles to stop for complete filter bank, which will operate as static, uncleaned filters. The second failure can be malfunctioning of, for example, 90% of solenoid valves. The third failure can be air leak of the flexible joints. The fourth failure can be the malfunctioning of diaphragm air valves. Moreover, these failure modes may not be adequately addressed when failure detection of the control unit and solenoids is limited, or when air valves, leakages and air pulses are not detected consistently, or when system control and monitoring is performed in an isolated manner without a distributed control system such that the pulsing on/off time is only achieved via local adjustment.

Some implementations may incorporate online monitoring of the sequence of events (SOE) of the cleaning cycle and realtime measurements of the effectiveness of each pulsing signal.

In these implementations, one or more fast sampling pressure transmitters can be installed. For example, the one or more fast sampling transmitters can be located at either PT 110 or PT 111. These fast sampling pressure transmitters are additional to the existing pressure restriction found in, for example, a 2" plant air manifold, which supply the filtration system 100 with the necessary air for the required cleaning pulses. These fast sampling pressure transmitters can be connected to a control system for realtime monitoring. In some cases, fast sampling can sample up to 10-100 times per second or even faster. Fast sampling improves temporal resolution of the air pressure data, which can, in turn, improve the sensitivity of monitoring the performance of individual system components. In these implementations, the transmitters can measure the pressure disturbance during each pulsing signal. By measuring typical pressure variation and sequencing the activations (pulsing) of system component, these implementations can achieve a correlation of the cleaning effectiveness for each signal. An alarm signal can be initiated from the control system for any abnormal pressure variation detected during pulsing and the sequence of events can be recorded.

Figure 2:
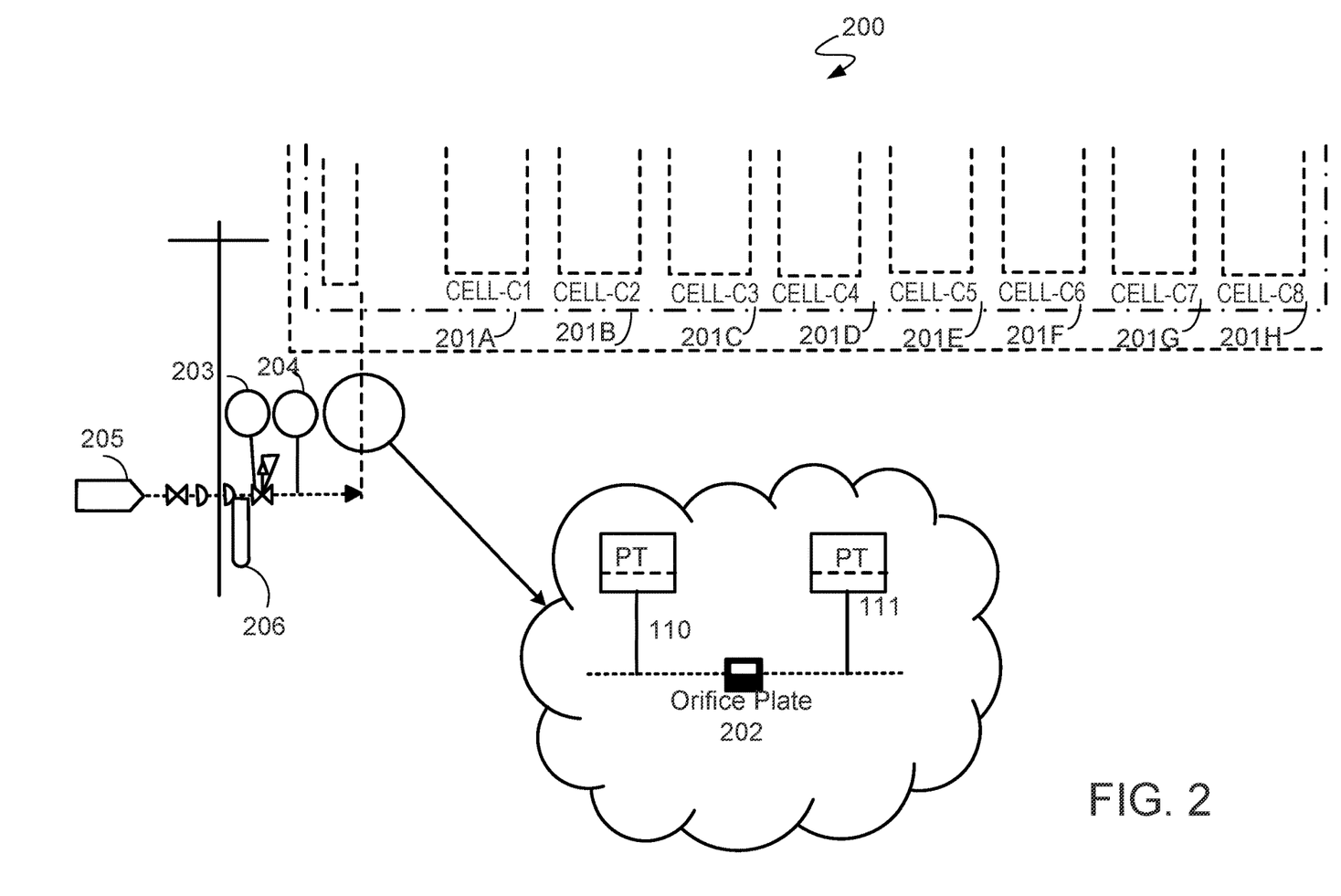
FIG. 2 illustrates an example of pressure transmitters added to a self-cleaning system according to an implementation of the present disclosure.

FIG. 2 illustrates an example of pressure transmitters added to a self-cleaning system according to an implementation of the present disclosure. In this example, the two pressure transmitters PT 110 and PT 111 are installed upstream and downstream, respectively, of orifice plate 202. The two pressure transmitters PT 110 and PT 111 are incorporated into the control system for realtime monitoring. As illustrated, pressure regulator valve 203, pressure indicator gauge 204, and pipe reducer 205 jointly operate on air inflow 206. Cells 201A to 201H represent groups of filter cartridges cleaned by specific air pulses. Each cell has a respective piping from the air supply header to air outlet "jets" that pulse the air through the entire group of cartridges for cleaning operation thereof.

Figure 3:
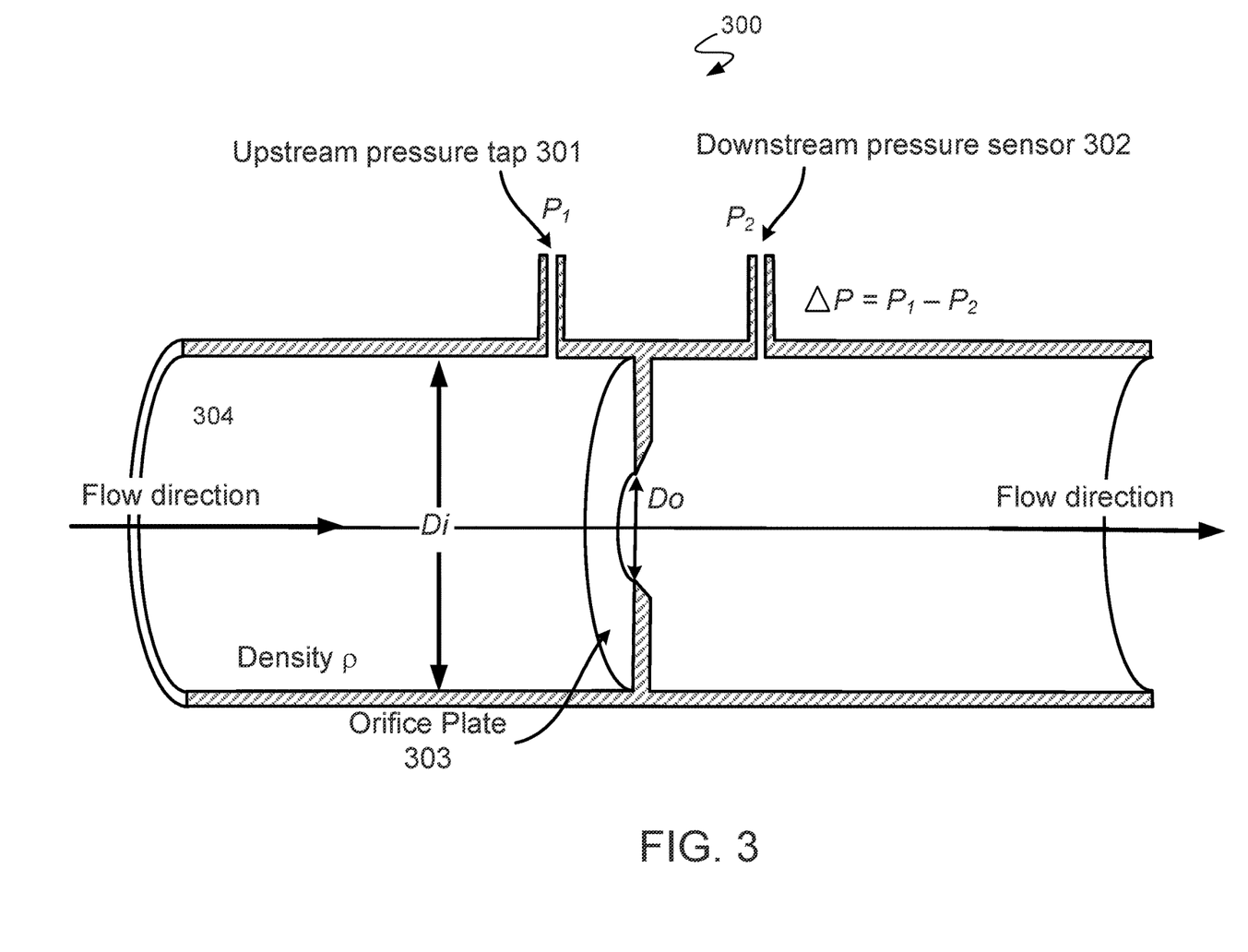
FIG. 3 illustrates an example of a configuration of pressure transmitters according to an implementation of the present disclosure.

FIG. 3 further illustrates an example of a configuration 300 of pressure transmitters according to an implementation of the present disclosure. Pressure tap 301 is located upstream of orifice plate 303 while pressure sensor 302 is located downstream of orifice plate 303. The pipe 304 has a diameter of Di for air flowing in from the left hand side. Orifice plate 303 has a restricted diameter Do. The narrowed diameter causes a pressure gap between pressure $P_1$ at upstream pressure tap 301 and pressure $P_2$ downstream pressure sensor 302. This pressure drop $\Delta P = P_1 - P_2$ signifies pressure disturbance across the orifice plate 303 during each pulsing signal. By monitoring pressure drop variation, the implementations can establish a correlation of the cleaning effectiveness for each pulsing signal. When an abnormal pressure drop variation is detected, an alarm may be triggered and the sequence of events may be recorded to build a database of profiles for future forecasts.

Some implementations may enhance the capability of capturing milliseconds pulses by incorporating new fast scanning programmable logic controller (PLC) to replace a sequencer board used to generate signal to the solenoids for air pulses on, for example, a Donaldson filter. As described above, the fast sampling can sample up to 10-100 times per second or even faster while conventional industrial systems may sample less than 1-10 times per second. This PLC controller can be programmed to perform the same functionalities of the sequencer board. In addition, the PLC controller incorporates a communication capability such that the self-cleaning system can migrate from a local in field controlled status, to a remote field controlled and monitored status. The remote operation generally connotes an operation more than 100 feet away from the field to the control room, or even a few miles away from the field, such as an engineering office, or even further to 100 miles away from the field, such as a central engineering office. In addition to generating a single pulse to the solenoids, this PLC controller can be programmed to, for example, control the whole filtration system (rather than separate controls over the upper and lower sections). The PLC controller can be further programmed to provide remote on/off pulse time adjustment, detect the differential pressure across the filter house and across the orifice plate in the air manifold, detect air leaks and insufficient air pulses, and detect environmental changes such as sandstorms and equipment status that may necessitate changes in cleaning cycles. Moreover, the PLC controller can be programmed to report defects to the DCS and PI® system, including the precise location where the defects occurred in one of the multitude of solenoids.

By sending online notification for abnormalities, the implementations can enable maintenance to act proactively to ensure the effectiveness of the cleaning cycles and to avoid filter degradation which can cause high differential pressure across the filter house. This feature can be advantageous because the feature can prolong the service life of the filter cartridges by enhancing the preventive maintenance and thereby cutting cost of replacements. The advantages can further include fuel gas saving by virtue of operating at lower differential pressure profile. In some cases, the estimated cost saving $115,000.00 per year for each gas turbine. The advantages can additionally include extra margin of exhaust temperature control during summer seasons given the increased output power.

Figure 4:
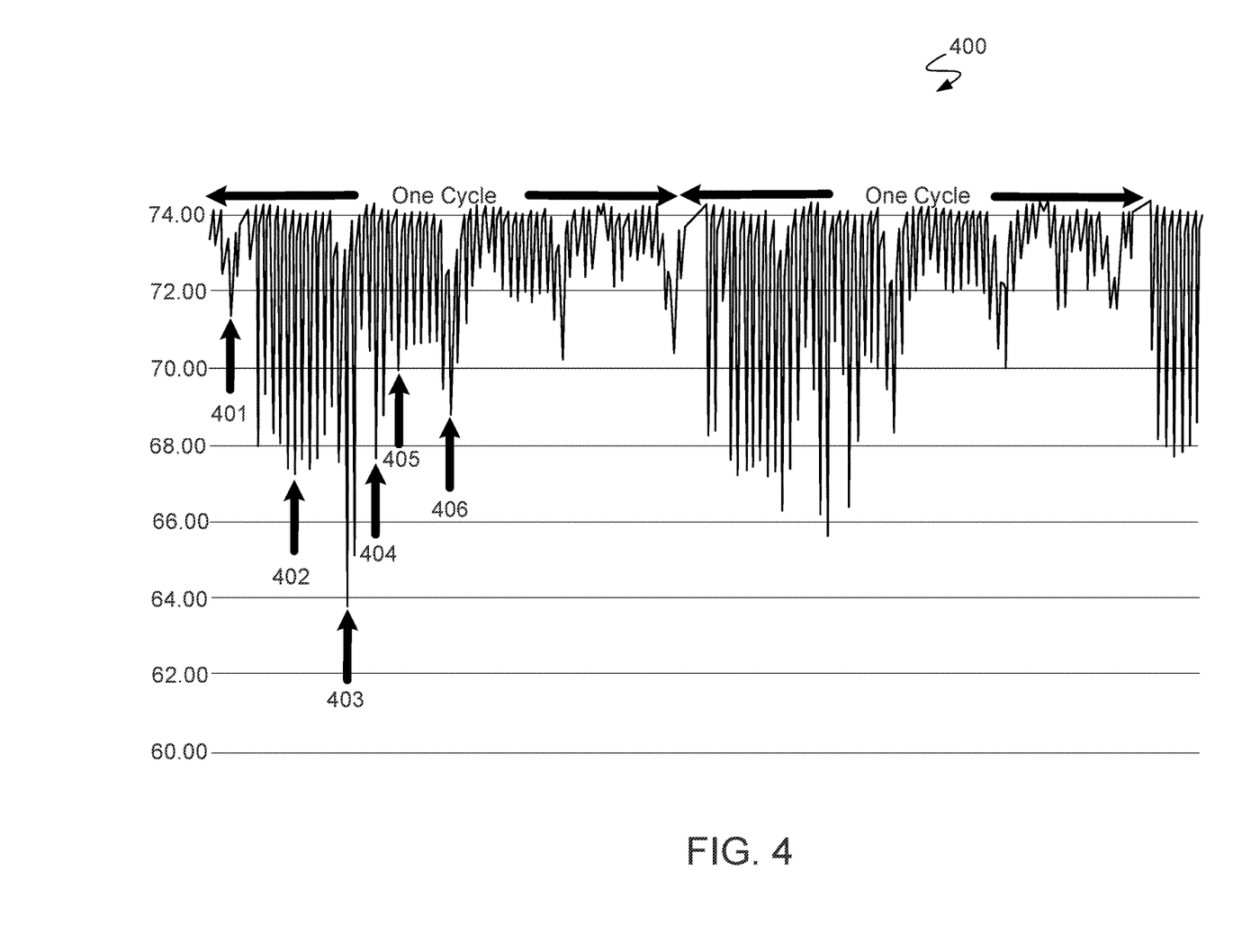
FIG. 4 illustrates examples of adaptive control of the air intake filtration system according to an implementation of the present disclosure.

FIG. 4 illustrates examples of adaptive control of the air intake filtration system according to an implementation of the present disclosure. The results are demonstrated on a gas turbine engine connected to a DCS & PI system. Here, the vertical axis corresponds to the air pressure. In the absence of a cleaning pulse, the pressure is expected to be 75 psig. At each cleaning pulse (indicated by arrows 402, 403, 404, 405, and 406 in diagram 400), the pressure drops. In this context, the magnitude of the pressure drop at each cleaning pulse can be interpreted to determine a condition of the filtration system components responsible for air pulses. For example, a steep pressure drop of the pressure gap due to the pressure decrease downstream of the orifice relative to the pressure upstream of the orifice. The magnitude of this drop and shape of the recovery back to the static pressure gap can reveal the effectiveness of the cleaning pulse as well as the health status of the filters.

Figure 5:
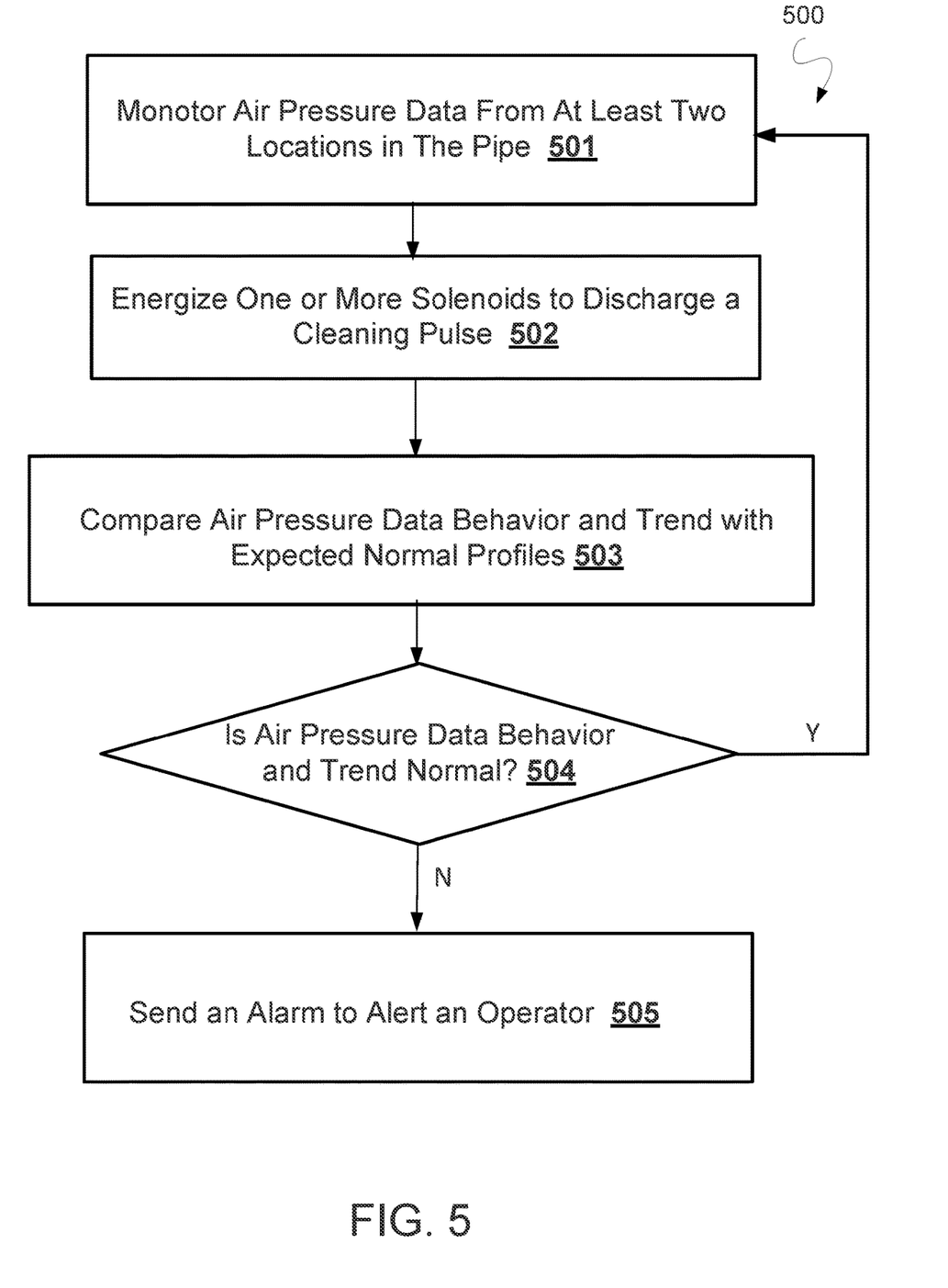
FIG. 5 illustrates an example of a flow chart according to an implementation of the present disclosure.

Referring to FIG. 5, in some implementations, the control system, for example, a PLC, can compare the monitored air pressure data behavior and trend with expected normal profile case to classify the monitored air pressure data (503). In some cases, the classification can determine whether the pressure drop is normal (504). If the result is abnormal, the control system may sound off an alarm to alert a human operator (505). In response, the human operator may review the air pressure data being monitored to further investigate. If the result is normal, the control system may revert to further monitoring of the air pressure data inside the pipe.

The implementations are not limited to the illustrated flow chart. Some implementations may further record the monitored air pressure data and build up a profile database in an adaptive manner based on user feedback. The process of building up the profile database can be iterative based on repeated user feedback. In these implementations, regression analysis and decision tree algorithms may be incorporated. Moreover, the implementations may further evaluate the effectiveness of each cleaning pulse based on the subsequent change of the pressure gap and the shape of the recovery. For example, some implementations may gauge the effectiveness of a particular cleaning pulses based on the subsequent drop of the pressure gap and the shape of the recovery. If the effectiveness is not adequate (for example, below a threshold level of acceptance), a new and separate cleaning pulse may be applied by, for example, energizing the solenoid(s) in a different manner.

Figure 6:
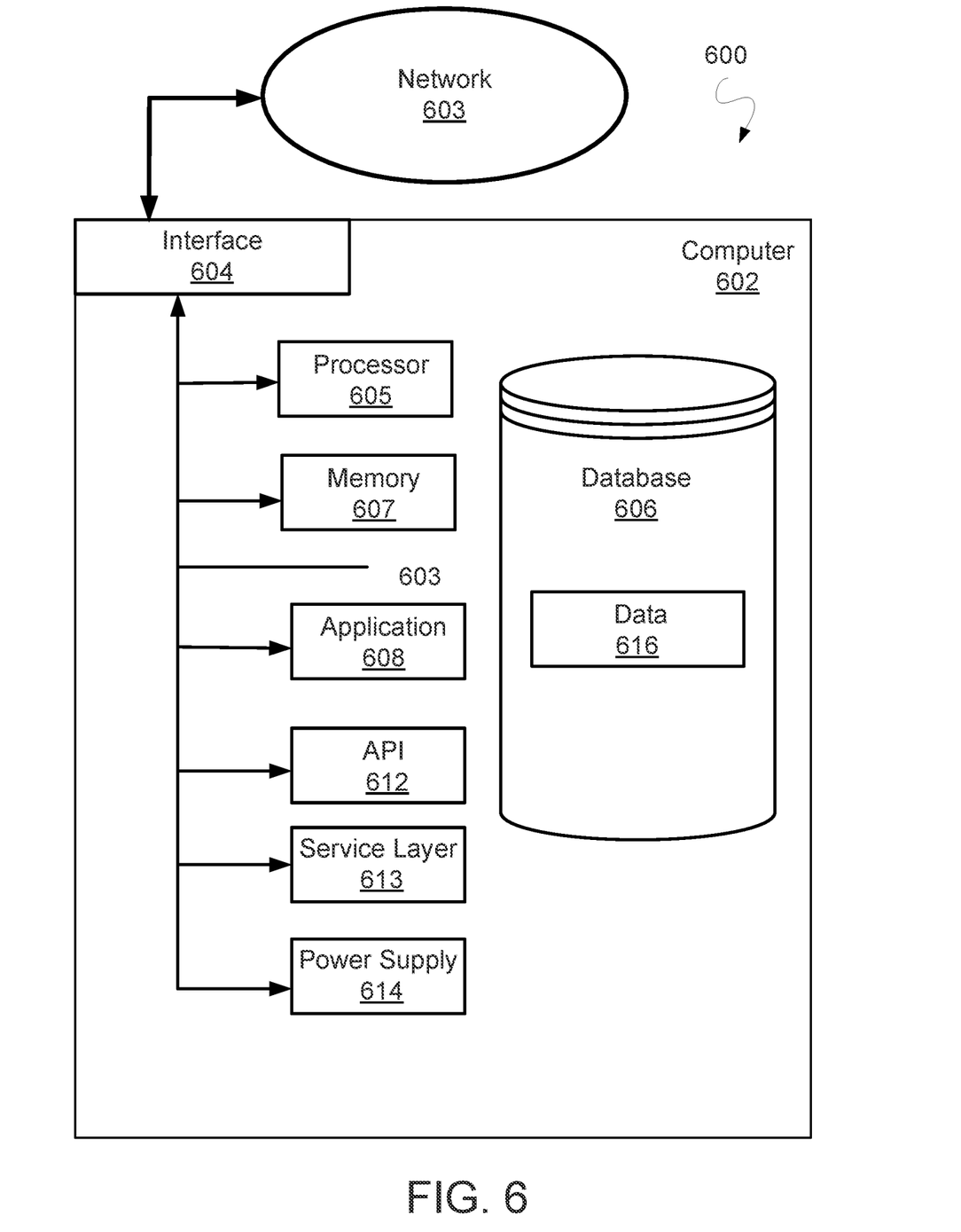
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, industrial automation system, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI.

The computer 602 can serve in a role in a computer system as a client, network component, a server, a database or another persistency, another role, or a combination of roles for performing the subject matter described in the present disclosure. The illustrated computer 602 is communicably coupled with a network 603. In some implementations, one or more components of the computer 602 can be configured to operate within an environment, including cloud-computing-based, local, global, another environment, or a combination of environments.

The computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 603 (for example, from a client software application executing on another computer 602) and respond to the received requests by processing the received requests using a software application or a combination of software applications. In addition, requests can also be sent to the computer 602 from internal users, external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 603 in a distributed environment. Generally, the interface 604 is operable to communicate with the network 603 and comprises logic encoded in software, hardware, or a combination of software and hardware. More specifically, the interface 604 can comprise software supporting one or more communication protocols associated with communications such that the network 603 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 604 that can hold data for the computer 602, another component communicatively linked to the network 603 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 holds the previously described data 616 including, for example, a database storing historical air pressure gap data, the corresponding filter status, and data of cleaning pulses being used.

The computer 602 also includes a memory 607 that can hold data for the computer 602, another component or components communicatively linked to the network 603 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in the present disclosure. For example, application 608 can serve as one or more components, modules, or applications. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power plug to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 603. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   monitoring an air pressure difference between two positions inside a pipe of an air filtration system;
   generating a first cleaning pulse inside the pipe to cause a drop of the air pressure difference being monitored;
   comparing a characteristic of the drop of the air pressure difference with a known profile; and
   based on results of the comparing, determining a status of at least one filter or filter cleaning component of the air filtration system;
   based on results of the comparing, determining an effectiveness of the first cleaning pulse; and
   in response to determining that the effectiveness of the first cleaning pulse is below a threshold, generating a second cleaning pulse inside the pipe,
   wherein the second cleaning pulse is different from the first cleaning pulse.

2. The computer-implemented method of claim 1, further comprising:
   in response to determining that the status of the at least one filter or filter cleaning component of the air filtration system is abnormal, sending an alarm to alert a time of the first cleaning pulse and a location within the air filtration system associated with the first cleaning pulse.

3. The computer-implemented method of claim 1, wherein generating the first cleaning pulse comprises: energizing one or more solenoids to discharge compressed air into the pipe.

4. The computer-implemented method of claim 1, wherein the characteristic of the drop of the air pressure difference comprises one of: a magnitude of the drop, or a recovery time for the air pressure difference to return to a pre-drop level.

5. The computer-implemented method of claim 1, wherein comparing a characteristic of the drop of the air pressure difference with a known profile comprises: performing at least one of: a regression function, or a decision tree algorithm.

6. The computer-implemented method of claim 1, wherein the known profile is established based on a historical record of known responses.

7. The computer-implemented method of claim 1, wherein the two positions inside the pipe are respectively located upstream and downstream of an orifice with an inner diameter smaller than the pipe.

8. A computer system comprising one or more processors configured to perform operations of:
   monitoring an air pressure difference between two positions inside a pipe of an air filtration system;
   generating a first cleaning pulse inside the pipe to cause a drop of the air pressure difference being monitored;
   comparing a characteristic of the drop of the air pressure difference with a known profile; and based on results of the comparing, determining a status of at least one filter or filter cleaning component of the air filtration system;

based on results of the comparing, determining an effectiveness of the first cleaning pulse; and in response to determining that the effectiveness of the first cleaning pulse is below a threshold, generating a second cleaning pulse inside the pipe, wherein the second cleaning pulse is different from the first cleaning pulse.

9. The computer system of claim 8, wherein the operations further comprise:

in response to determining that the status of the at least one filter or filter cleaning component of the air filtration system is abnormal, sending an alarm to alert of a time of the first cleaning pulse and a location within the air filtration system associated with the first cleaning pulse.

10. The computer system of claim 8, wherein generating the first cleaning pulse comprises: energizing one or more solenoids to discharge compressed air into the pipe.

11. The computer system of claim 8, wherein the characteristic of the drop of the air pressure difference comprises one of: a magnitude of the drop, or a recovery time for the air pressure difference to return to a pre-drop level.

12. The computer system of claim 8, wherein comparing a characteristic of the drop of the air pressure difference with a known profile comprises: performing at least one of: a regression function, or a decision tree algorithm.

13. The computer system of claim 8, wherein the known profile is established based on a historical record of known responses.

14. The computer system of claim 8, wherein the two positions inside the pipe are respectively located upstream and downstream of an orifice with an inner diameter smaller than the pipe.

\* \* \* \* \*